US006238444B1

United States Patent
Cadwallader

(12) 
(10) Patent No.: US 6,238,444 B1
(45) Date of Patent: May 29, 2001

(54) METHOD FOR MAKING TANTALUM CHIP CAPACITOR

(75) Inventor: John Yates Cadwallader, Kennebunk, ME (US)

(73) Assignee: Vishay Sprague, Inc., Sanford, ME (US)

( * ) Notice: Subject to any disclaimer, the term of this patent is extended or adjusted under 35 U.S.C. 154(b) by 0 days.

(21) Appl. No.: 09/167,690

(22) Filed: Oct. 7, 1998

(51) Int. Cl.[7] .............................. H01G 9/00; H01G 9/042; H01G 2/10; H01G 4/228
(52) U.S. Cl. ..................... 29/25.03; 361/523; 361/529; 361/535; 361/540
(58) Field of Search .................... 29/25.03, 25.41–24.42; 361/523, 529, 540, 535; 219/121.6; 205/200

(56) References Cited

U.S. PATENT DOCUMENTS

| | | | |
|---|---|---|---|
| 3,828,227 | * 8/1974 | Millard et al. | 317/230 |
| 4,090,288 | * 5/1978 | Thompson et al. | 29/570 |
| 4,097,915 | 6/1978 | Locke | 361/540 |
| 4,203,194 | 5/1980 | McGrath | 29/25.03 |
| 4,310,566 | 1/1982 | McGrath | 427/80 |
| 4,488,204 | 12/1984 | Beck, Jr. | 361/540 |
| 4,571,662 | 2/1986 | Conquest et al. | 361/306.1 |
| 4,688,322 | 8/1987 | Fossey | 29/25.03 |
| 5,390,074 | * 2/1995 | Hasegawa et al. | 361/540 |
| 5,483,415 | * 1/1996 | Nakamura et al. | 361/529 |

FOREIGN PATENT DOCUMENTS 2 123 610A    2/1984  (GB) .

OTHER PUBLICATIONS

Drawing: Panasonic: KE Series—New. Jun., 1997. Two pages.
Drawing: Panasonic: New Product News, KE S size (0805). Two pages. Date unknown, but believed to be prior art.
Article: Press Release: "Tantalum breakthrough doubles chip capacitance." Published on or before 1994.
Article: "New Tantalum Capacitor Design For 0603 Size", Ian Salisbury. Mar., 1996.

* cited by examiner

Primary Examiner—Jey Tsai
Assistant Examiner—Ha Tran Nguyen
(74) Attorney, Agent, or Firm—Zarley, McKee, Thomte, Voorhees & Sease

(57) ABSTRACT

The tantalum chip capacitor of the present invention includes a anode terminal which is substantially flat. The tantalum wire which extends from the tantalum pellet through the insulating material terminates substantially flush with the insulating material, allowing the termination materials to be applied over a substantially flat surface. The tantalum chip capacitors of the present invention are created by methods which include the step of grinding the anode end of the capacitor so that the tantalum wire is flush with the insulating material. Conductive materials can then be applied to the anode end of the capacitor creating a substantially flat anode terminal.

7 Claims, 4 Drawing Sheets

METHOD FOR MAKING TANTALUM CHIP CAPACITOR

BACKGROUND OF THE INVENTION

1. Field of the Invention

The present invention relates to tantalum chip capacitors. More particularly, though not exclusively, the present invention relates to improved tantalum chip capacitors and methods for manufacturing the same.

2. Problem in the Art

Capacitors exist in the art which are made from a capacitive element such as a tantalum slug or pellet. To create a conventional tantalum slug, tantalum powder is pressed with a binder and then exposed to a process for forming a polarized capacitor having a positive end and a negative end. A typical tantalum slug will have an anode comprised of a wire extending from the slug and a cathode comprised of a conductive surface formed at the opposite side of the tantalum slug.

Some prior art tantalum capacitors are formed by cutting the anode wire and covering the anode and cathode ends of the capacitor with a conductive material. This results in a nib or bump that sticks out of the package, increasing the size and non-uniformity of the part. The electrical contact between the tantalum wire and the conductive material is through the sides of the tantalum wire, therefore requiring this nib.

Other prior art tantalum slugs are fitted with external leads which are comprised of discrete pieces of metal attached to the anode and cathode of the capacitive element. Users of such tantalum capacitors desire to attach the capacitors to a circuit board using reflow solder. As a result, terminations are required which are suitable to be attached to a circuit board using reflow solder. Prior art tantalum capacitors fitted with such external leads have been produced in various ways. Some prior art capacitors are made using a lead frame providing connection terminals where the tantalum slug is placed within a lead frame. An electrical connection is made between the anode and cathode and one of the connection terminals. Other prior art tantalum capacitors use a flat metal piece which is directly connected to the anode lead of the tantalum slug. The excess portions of the anode leads can be sheared off so that the flat metal piece provides a surface for use as an anode terminal. Other prior art tantalum slugs are disposed within metal channels which form anode and cathode terminals. The anode lead wire of the tantalum slug can be welded to the metal channel to form an electrical connection. Other prior art tantalum slugs simply have discrete metal terminals which are fixed to the ends of the tantalum slug and which make electrical contact to the anodes and cathodes of the tantalum slug. Still other prior art tantalum slugs are processed with a flat piece of tantalum metal being substituted for the tantalum wire at the anode end, and with a similar flat piece of metal being attached to the opposing cathode end, and with both pieces of metal being further metallized on their external faces so as to provide solderable surfaces.

It is known in other fields of technology to use thin film metallization methods such as sputtering to coat the ends of devices such as chip resistors.

It can therefore be seen that there is a need for an improved tantalum chip capacitor and method for making the same.

FEATURES OF THE INVENTION

A general feature of the present invention is the provision of an improved tantalum chip capacitor and a method for making the same which overcomes problems found in the prior art.

A further feature of the present invention is the provision of an improved tantalum chip capacitor and a method for making the same in which the cross sectional surface of the tantalum wire is metallized at the point of egress from the insulating package creating a conformal, uniformly shaped device.

A further feature of the present invention is the provision of a method of making an improved tantalum chip capacitor which includes a step of cutting or grinding the tantalum wire such that the finished product does not include a protrusion caused by the tantalum wire or that such protrusion is negligible.

Further features, objects, and advantages of the present invention include:

An improved tantalum chip capacitor and method which results in improved utilization of available package volume, specifically, such that a larger portion of the available package volume may be occupied by the tantalum capacitor element.

An improved tantalum chip capacitor and method which results in improved handleability through the elimination of the protruding tantalum wire and more consistent package dimensions and shapes.

An improved tantalum chip capacitor and method which results in improved electrical stability of the capacitor including the equivalent series resistance (ESR) of the capacitor.

An improved tantalum chip capacitor and method which results in improved manufacturability and a reduced manufacturing cost.

An improved tantalum chip capacitor and method resulting from the use of thin film processes to create terminations on the capacitor and from avoiding the use of discrete pieces of metal to create such terminations.

An improved tantalum chip capacitor and method which utilizes vacuum processes such as sputtering or evaporation to create terminations on the capacitor.

These as well as other objects features and advantages of the present invention will become apparent from the following specification and claims.

SUMMARY OF THE INVENTION

The tantalum chip capacitor of the present invention includes a tantalum element with an insulating material surrounding at least a portion of the element. A tantalum wire is electrically connected to the tantalum element and extends through the insulating material. The tantalum wire is cut or ground at the point of egress from the insulating material such that the exposed surface of the wire is substantially flush with the insulating material and is electrically connected to a first terminal which is substantially flat in the proximity of the wire. The second end of the tantalum element is electrically connected to a second terminal.

The tantalum chip capacitors of the present invention can be created by a number of methods. A first method for creating the tantalum chip capacitor of the present invention includes the steps of grinding the second end of the element to expose a conductive surface, applying a conductive material to both ends of the capacitor element where terminations are desired, cutting or grinding the first end of the capacitor element so that the terminal wire becomes substantially flush with the first end creating a flush surface on the first end, applying a conductive material to the first end of the element, and applying termination materials to both ends to create terminations. A second method of creating the tantalum chip capacitors of the present invention includes the steps of cutting or grinding the first end of the capacitor element so that the end of the wire is substantially flush with the first end of the element, applying a conductive material to the surfaces of the capacitor element, masking the first and second ends of the element where terminations are desired, removing the unmasked conductive material, removing the masks, and applying termination materials to the first and second ends to create terminations.

A third method comprises making the terminal wire flush with the first end of the capacitor chip element and applying a conductive material to the first and second ends of the capacitor chip element where terminations are desired. A further embodiment of this third method includes arranging a plurality of capacitor chip elements in a grid with the first and second ends of the capacitor elements exposed and the side surfaces masked by adjacent capacitor elements, and applying conductive material to the exposed first and second ends of the capacitor elements where terminations are desired.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

Figure 1:
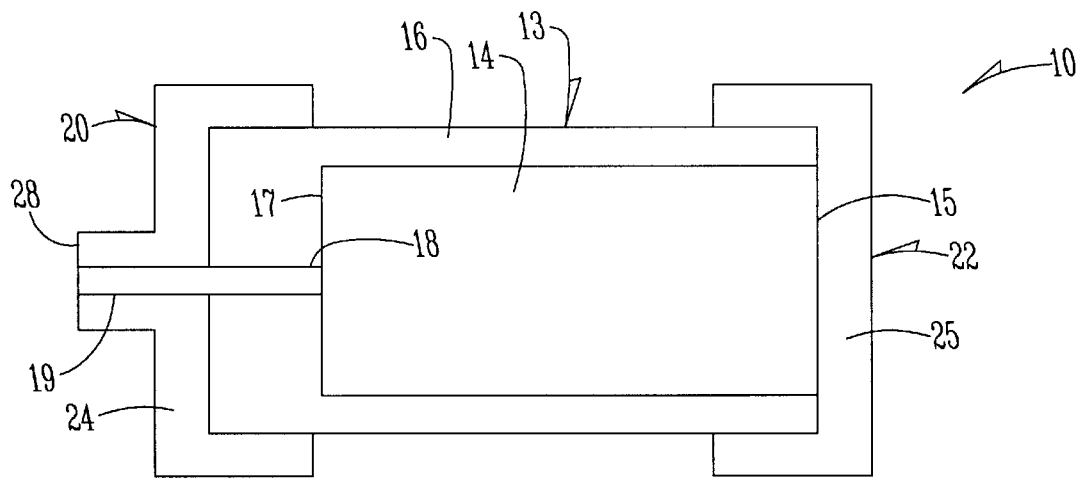
FIG. 1 is a cross sectional view of a prior art tantalum capacitor.

FIG. 1 shows a typical prior art tantalum capacitor 10. A detailed description of the construction of a tantalum capacitor like the tantalum capacitor 10 is described by Thompson et al. in U.S. Pat. No. 4,090,288 issued May 23, 1978 which is incorporated by reference herein. The tantalum capacitor of FIG. 1 is summarized as follows. The capacitor includes a sintered tantalum pellet 14 having a tantalum wire embedded or welded to the pellet. A dielectric film of tantalum oxide is formed over all surfaces of the particles in the pellet 14 including those of the anode wire. A solid electrolyte, preferably of manganese dioxide, is then impregnated in the spaces between the tantelum oxide coated tantelum particles and forms the cathode of the capacitor. Next, a conductive counterelectrode layer (not shown) overlies the exterior of pellet 14 and is in electrical continuity with the manganese dioxide cathode of the capacitor. The counterelectrode layer is preferably comprised of a first sublayer of graphite and an overlayer of metal particles, preferably silver, in a binder or organic resin. The counterelectrode layer must extend over the cathode end 15 of the tantalum pellet 14 so as to make electrical contact with a subsequently formed cathode end cap 25, as well as to help seal the manganese dioxide layer. The counterelectrode layer overlies substantially all of the surface of the tantalum pellet to obtain a capacitor having a minimum dissipation factor and ESR, but is maintained separate from, and out of electrical continuity with the anode wire 18. Next, an insulative organic coating 16 is formed over the counterelectrode layer at the anode end face 17 of the tantalum pellet and at substantially all of the side faces of the pellet 14 while not extending over the cathode end 15. A conductive cathode end cap 25 is then formed over the cathode end face 15 and is bonded in contact with the cathode end 15 of the counterelectrode layer, thus forming a cathode terminal 22. A conductive anode end cap 24 is formed over the insulative coating at the anode end 17 of the pellet 14 where it makes electrical contact with the anode wire 18 and forms an anode terminal 20. A plurality of the capacitors can be created simultaneously while the capacitors are held by their respective anode wires 18 which are welded to a carrier bar (not shown). At the point when the anode wire is cut (or flexing the wire where it has previously been nicked), a short stub 19 is left extending beyond the insulative coating of the capacitor.

Figure 2:
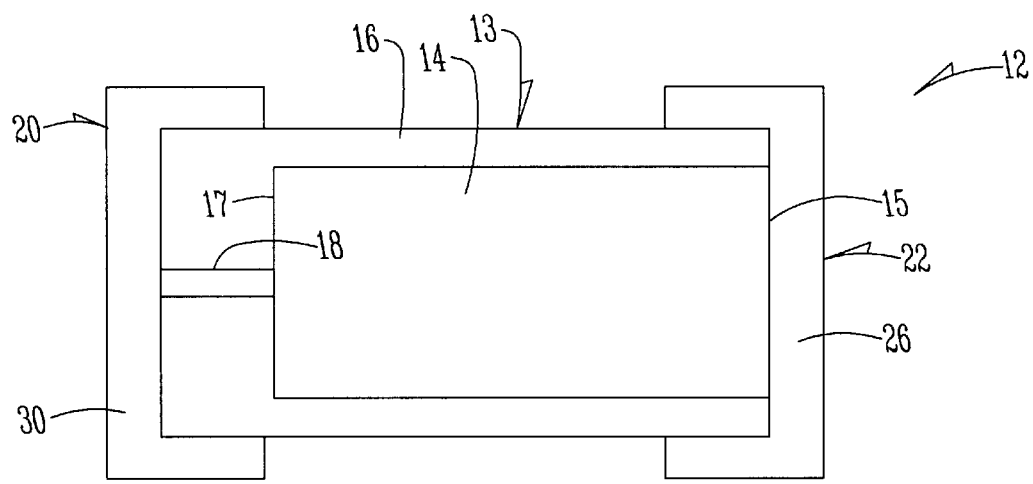
FIG. 2 is a cross sectional view of a tantalum capacitor of the present invention.

FIG. 2 shows an improved tantalum chip capacitor 12 of the present invention which may have a similar internal structure to the capacitor 10 shown in FIG. 1. Both tantalum chip capacitors 10 (FIG. 1) and 12 (FIG. 2) include a chip element 13 comprised of a silvered tantalum pellet 14. Note that in the figures, for clarity, the various portions of the capacitors are shown with straight and sharply cornered edges. The actual capacitors may have slightly rounded corners, etc. The tantalum pellet 14 is surrounded by an insulating material 16 and includes a tantalum wire 18 projecting from the tantalum pellet 14 and passing through the insulating material 16. The tantalum wire 18 will be electrically connected to the anode terminal 20 of the capacitor 10 or 12. The opposite cathode end 15 of the tantalum chip element 13 will electrically connect to a cathode terminal 22.

As shown in FIG. 1, the tantalum wire 18 extends from the pellet 14 and insulating material 16 where it makes contact with a termination cap 24 forming the anode terminal 20 of the capacitor 10. In prior art tantalum capacitors, the tantalum wire 18 makes electrical contact with the termination cap 24 at the sides of the wire 18. At the opposite end 15 of the tantalum pellet 14, a cathode termination cap 25 makes electrical contact with end 15 the tantalum pellet 14 forming a cathode terminal 22. The prior art tantalum chip capacitor 10 includes a nib or protrusion 28 at the anode end of the capacitor 10. Nib 28 houses the wire stub 19. This results in non-uniform parts as well as other disadvantages as discussed above.

As shown in FIG. 2, the tantalum chip capacitor 12 of the present invention does not have a nib 28 or a wire stub 19. The tantalum wire 18 terminates substantially flush with the insulating material 16. The end of the tantalum wire 18 makes electrical contact with the anode termination cap 30 which forms the anode terminal 20. As a result, the anode terminal 20 of the tantalum chip capacitor 12 is flat and uniform. This results in a capacitor having improved volumetric efficiency and provides more consistent package dimensions and shape. A cathode cap 26 makes electrical contact with the conductive material on the cathode end 32 of the pellet 14 to form the cathode terminal 22.

The tantalum chip capacitor 12 can be manufactured using a variety of methods discussed below. FIGS. 3–6 show a first method of manufacturing the tantalum chip capacitor 12 while FIGS. 7–11 and FIGS. 12–15 illustrate two alternative methods. In using the method shown in FIGS. 3–6, metallic material is deposited on selected exterior surfaces of the chip element 13. With the method shown in FIGS. 7–11, metallic material is deposited on the entire chip element 13 and removed where not desired. Using the method shown in FIGS. 12–15, metallic material is selectively deposited on the chip element 13 where desired. With any of these methods, one or more thin conductive films form a substitute for the cathode terminal 22 and an anode terminal 20 of FIG. 1. These films are suitable for reflow soldering by a user. Note that some of the steps in the three methods described below could be interchanged among the three methods. In addition, the sequence of the steps can be varied.

When the tantalum chip elements 13 are produced, the tantalum wire 18 extends from the silvered tantalum pellet 14 and is welded to a stainless steel bar (not shown) for handling purposes. This configuration is used to mold the insulating material 16 around the tantalum pellet 14. In a typical configuration, 25 to 75 of the silvered tantalum pellets 14 are positioned in a row and welded to a ten inch stainless steel bar. Eventually, the tantalum wire 18 is cut and the anode and cathode terminals are formed.

Figure 3:
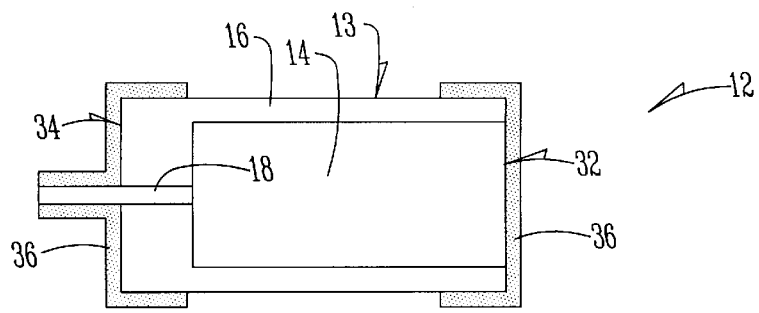
FIGS. 3–6 are cross sectional views of the tantalum capacitor shown in FIG. 2 shown at various manufacturing stages.

A first method is illustrated in FIGS. 3–6. As shown in FIG. 3, the tantalum chip element 13 has a cathode end 32 and an anode end 34. The first step after the molding process described above is to grind (not shown) the insulative layer 16 off of the cathode end 32 of the capacitor to insure a uniform shape and expose the conductive surface of the tantellum pellet 14. While grinding is the preferred technique to expose the conductive surface of the cathode end 32 of the pellet 14, other techniques could also be used. With any process, the outer dimensions of the chip element 13 should be defined. As shown in FIG. 3, a volume of silver paint 36 (or conductive epoxy silver) is applied to the cathode end 32 of the capacitor. The silver paint 36 defines the outline of the terminations 26 and 30 shown in FIG. 2. The silver paint 36 is comprised of an organic resin heavily filled with silver flakes, making it conductive. Since the silver paint 36 is conductive, it will not have to be removed before the termination materials 26 and 30 are applied. The silver paint 36 makes electrical contact with the cathode end 32 of the silvered pellet 14 creating the start of the termination 26. As also shown in FIG. 3, silver paint 36 is applied at the anode end 34 of the capacitor and makes contact to the insulating material 16 as well as the tantalum wire 18.

Figure 4:
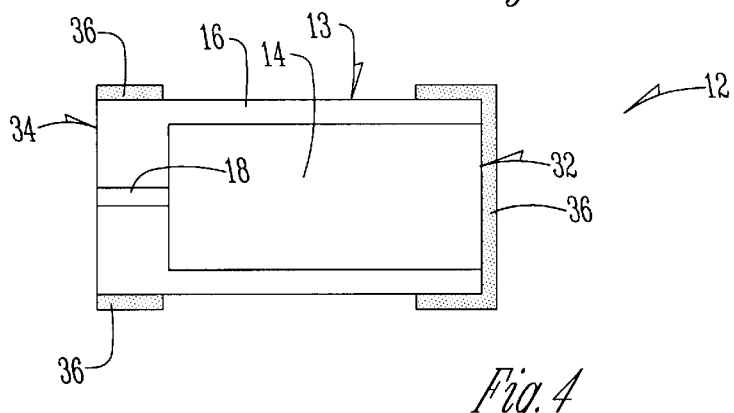

The tantalum wire 18 is then cut nearly flush with the insulating material 16. Next, the anode end 34 of the capacitor is ground making the end of the tantalum wire 18 flush with the insulating material 16 (FIG. 4). As shown in FIG. 4, a portion of the silver paint 36 is still left on the insulating material 16. At this point, a plurality of the chip elements 13 are aligned in a grid with the anode ends 34 exposed (not shown). The anode ends 34 are then metallized to form a metal film 38. In other words, the metal is selectively deposited on only the anode end 34 of each capacitor 12 so that a removal step is not required to remove deposited metal where not desired. The anode ends 34 are preferably metallized using vacuum processes, for example, sputtering or thermal deposition to deposit the termination material 38 on the end 34 of chip element 13. An alternative metallizing method is plating, although sputtering or thermal deposition is the preferred method because of better adhesion. The sputtering or thermal deposition processes used with the present invention are known in the art. These processes are performed in a vacuum chamber with a source of metal such as nickel, chromium or copper within the vacuum chamber. The metal is evaporated, travels through the vacuum and deposits on the exposed surfaces 34 of the capacitor 12. To evaporate the metal, the sputtering process creates a plasma of argon ions in the vicinity of the source of metal. The surface of the metal source gets bombarded by argon ions transferring energy to the metal resulting in evaporation of metal atoms from the surface. Alternatively, the thermal deposition process uses an electron beam or electrical current to heat the source of metal causing it to melt and release evaporated metal atoms. Either method results in metal atoms coming from the source of metal and depositing themselves on whatever surface is in their path.

Figure 5:
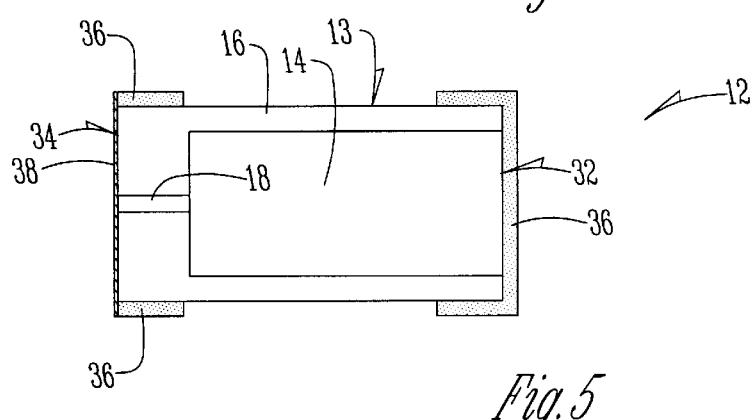
Figure 6:
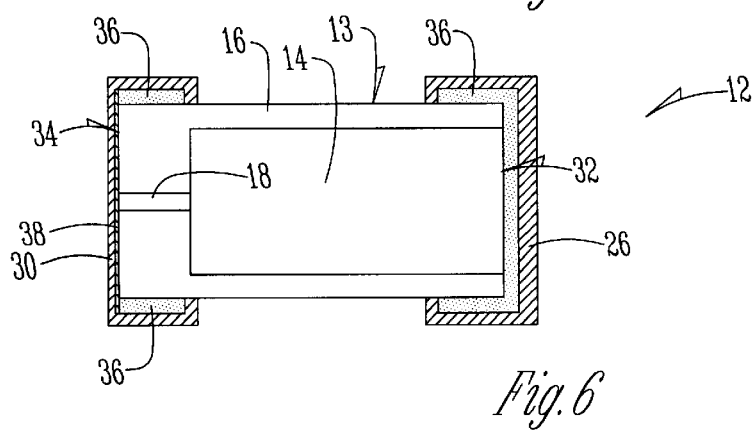

After the sputtering process, the anode end 34 of the chip element 13 will be metallized with a layer of metal 38 (FIG. 5). At this point, termination caps 26 and 30 are applied to the capacitor 12 to form the terminals of the capacitor. The anode and cathode caps 26, 30 may be formed by a conventional barrel plating process. The termination caps 26 and 30 are preferably comprised of a combination of nickel and tin/lead or solder. The resulting component is shown in FIG. 6 as well as in FIG. 2.

Figure 7:
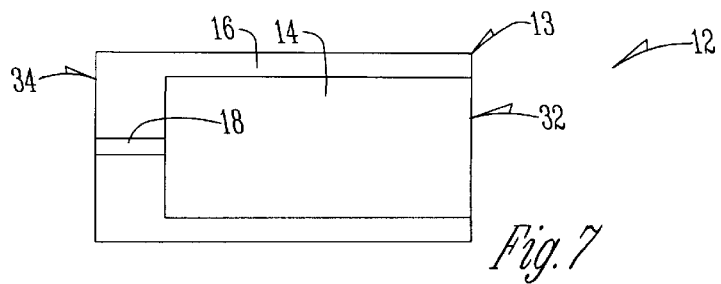
FIGS. 7–11 are cross sectional views of the tantalum capacitor shown in FIG. 2 shown at various manufacturing stages of an alternative embodiment.

In an alternative method illustrated in FIGS. 7–11, a similar result is achieved. The same capacitive chip element 13 is used with the alternative method shown in FIGS. 7–11 as was used with the method shown in FIGS. 3–6. Again, the silvered tantalum pellet 14 has a tantalum wire 18 extending from it which is attached to a stainless steel bar (not shown). The insulating material 16 is molded around the pellet 14. As shown in FIG. 7, the tantalum wire 18 is cut to remove the chip element 13 from the bar. The chip element 13 is then ground at the anode end 34 to make the end of wire 18 flush with the insulative layer 16, and at the cathode end 32 to expose the conductive surface of the tantellum pellet 14. Again, the cathode end 32 of the tantalum pellet 14 will be electrically connected to a cathode terminal while the end of the tantalum wire 18 will be electrically connected to an anode terminal. As shown, the end of the tantalum wire 18 is flush with the insulating material 16 after the grinding process.

Figure 8:
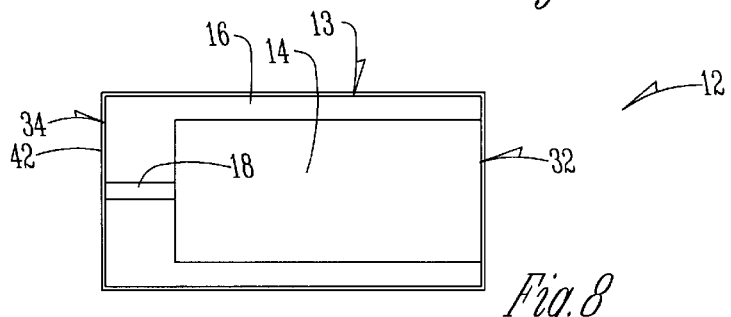

The next step is to metallize the entire outer surface of the capacitor. This can be achieved by barrel sputtering. The resulting metallized component is shown in FIG. 8. In the barrel sputtering step, a plurality of the parts shown in FIG. 7 are put into a barrel and tumbled so that all the surfaces of the parts will be metallized. Nickel atoms will come in one end of the barrel and deposit themselves on the components within the barrel. After the barrel sputtering step, a thin layer 42 of nickel is deposited on the entire surface of the component (FIG. 8). Since a layer of nickel is desired only where the terminations 26 and 30 will be formed, the remainder of the nickel layer 42 must be removed.

As an alternative, barrel plating or other forms of plating can be used in the place of barrel sputtering.

Figure 9:
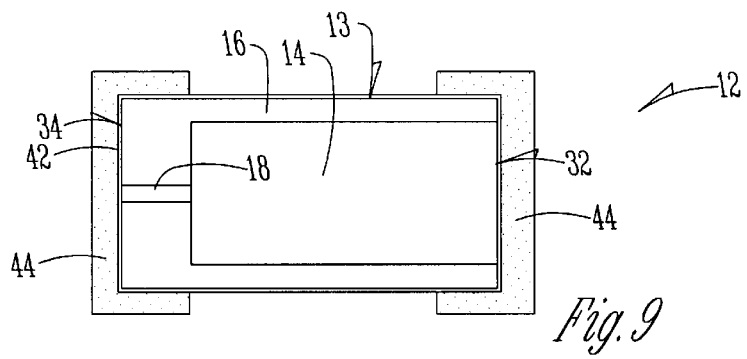
Figure 10:
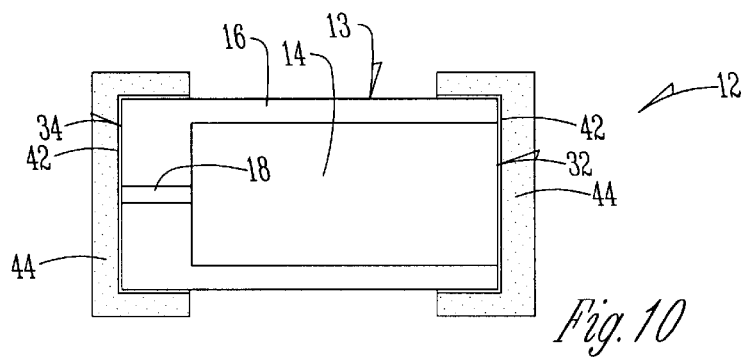

In the next step, the components are oriented so that they may be dipped in a source of organic resin 44 to mask the ends where the terminations 26 and 30 will be formed. To orient the parts, a board is provided having a plurality of holes formed through it. Loose components are placed on the board which is then vibrated so that the components will fall through the holes such that they are captured in the board with one end of the component sticking out one side and the opposite end sticking out the other side. It is not important that the components be oriented with respect to the board. That is, the components can be randomly oriented with both anode and cathode ends sticking out of either side of the board. The parts can then be dipped in a source of the organic resin 44 to mask the ends (FIG. 9). In other words, the portions of the nickel layer 42 disposed where the terminations 26 and 30 will be formed are masked by the organic resin 44. The remaining portion of the nickel layer 42 is left exposed. The unmasked nickel layer 42 is then removed resulting in the component shown in FIG. 10. The nickel layer 42 may be removed using a number of methods including an acid etch.

Figure 11:
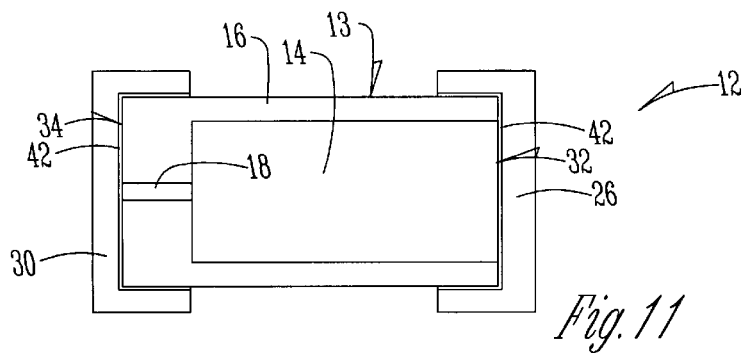

Next, the mask 44 is removed leaving "end caps" on the part comprised of the remaining nickel layer 42. The termination materials 26 and 30 are then applied over these "end caps" to form the anode and cathode terminations. The termination materials 26 and 30 may be applied using a number of methods including barrel plating. Note that the nickel layer 42 would not be thick enough by itself for use in many applications, so the thickness must be built up by applying the termination materials 26 and 30. Multiple layers of plating are typically required to provide the desired terminations. The resulting tantalum capacitor 12 is shown in FIG. 11 as well as in FIG. 2.

Figure 12:
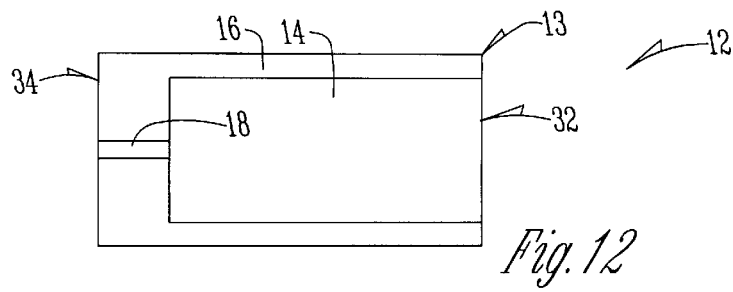
FIGS. 12–15 are cross sectional view of the tantalum capacitor shown in FIG. 2 shown at various manufacturing stages of an alternative embodiment.

In another alternative method illustrated in FIGS. 12–15, a similar result is achieved. The same capacitive chip elements 13 are used with the alternative method shown in FIGS. 12–15 as well as the methods shown in FIGS. 3–11. As discussed above, the silvered tantalum pellet 14 has a tantalum wire 18 extending from it which is attached to a bar (not shown). The insulating material 16 is molded around the pellet 14. As shown in FIG. 12, the tantalum wire 18 is cut to remove the chip element 13 from the bar. Preferably, the tantalum wire 18 is cut substantially flush with the anode end 34 of the chip element 13. Optionally, the anode and/or cathode ends 34 and 32 may be ground before the next step.

Figure 13:
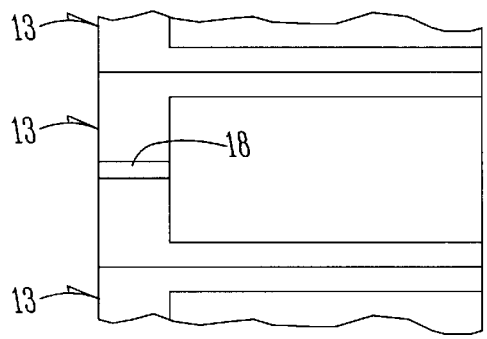

The next step of the process is to mask four sides of the chip element 13 leaving the anode end 34 and cathode end 32 exposed. Preferably, the four sides of the element 13 are masked by arranging a plurality of similar elements 13 in a grid. FIG. 13 shows a side view of such an arrangement. In this grid arrangement, the side portions of each of the chip elements 13 will be masked by the adjacent element 13. As shown, both ends of the elements are exposed.

Figure 14:
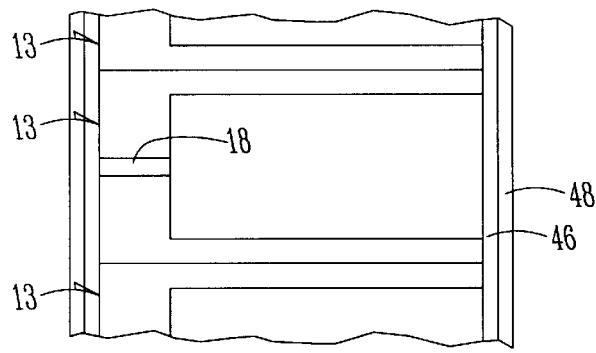

The next step is to metallize the exposed ends of the plurality of chip elements 13. This may be achieved by depositing layers of nickel 46 and solder 48 (FIG. 14). The nickel may be deposited by vacuum deposition (sputtering or thermal deposition) or by plating (electroless) or electrolytic (or by combinations thereof). The solder is preferably comprised of metallic tin and/or lead, singularly or in combination, deposited by similar means as the nickel or by a hot solder dip. FIG. 14 shows the resulting layers 46 and 48 deposited on the exposed ends of the plurality of elements 13.

Figure 15:
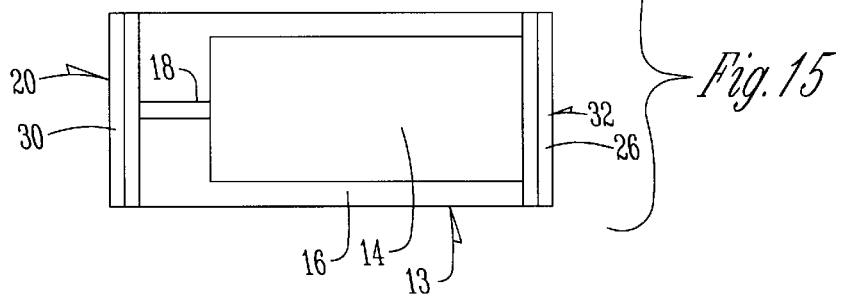

Finally, the plurality of elements 13 are separated into the finished components shown in FIG. 15. As shown in FIG. 15, the anode terminals 30 and cathode terminals 26 are located at the end of each component as shown.

As mentioned before, the steps reciting "grinding" of the anode end could be accomplished in other ways. For example, in the tantalum wire 18 may be cut substantially flush with the anode end of the capacitive element rather than ground. In, fact this may be the preferred method. Another alternative is to nick the wire at its point of egress from the insulated body either before or after adding the insulating material. The wire could then be separated or broken by repeated flexing in the proximity of the nick. Grinding is an optional technique for enhancing the flatness of the surface after wire separation by either of the techniques described above.

Similarly, the steps reciting "grinding" of the cathode end could be accomplished in other ways. For example, in the method shown in FIGS. 12–15, the part is molded so as to leave the cathode (−) end exposed. This can be accomplished by using movable pins or elastomeric materials within the cavity, which press against the cathode end of the part and prevent coverage by the insulating material.

The number of surfaces in which the terminations are wrapped around can also be varied. For example, FIG. 2 shows a component with terminations which wrap around at least two (presumably 4) of the adjoining side surfaces. FIG. 15 shows a finished device with only the end surfaces metallized. With any of the methods, the number of surfaces of each terminal may vary from 1 to 5.

The methods illustrated in FIGS. 3–11 are described as using evaporation and barrel sputtering as the preferred methods of depositing a thin initial layer of base metal (e.g., nickel) on the area of the terminations, and, to make contact with the tantalum wire. Both methods describe that subsequent plating steps may be used to add the necessary thicker terminal material. The method illustrated in FIGS. 12–15 assumes that the required thickness can be built using vacuum metallization steps only, without the need for subsequent plating steps. However, it should be understood that with any method, the necessary thickness can be provided by either vacuum metallization alone, or by combination with plating, for example.

While the present invention can be accomplished using the methods described above, it us understood that various other methods could be used within the spirit and scope of the present invention.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of creating terminations for a tantalum capacitor comprising:

forming a tantalum pellet having a cathode end, an anode end, pellet sides extending between said anode and cathode ends, and a conductive wire attached to said anode end of said pellet, said conductive wire having a portion thereof extending from said anode end of said pellet;

molding an insulation material over said anode end and said pellet sides of said pellet to create a layer of said insulation material exterior of, and in covering relation over said anode end and said pellet sides of said pellet, whereby said conductive wire extends through and has a protruding wire portion protruding from an exterior surface of said layer of insulation material;

removing said protruding portion of said wire so that said wire has a wire end exposed at, and approximately flush with, said exterior surface of said layer of insulation material without exposing said tantalum pellet through said layer of insulation material;

applying an anode layer of conductive material over said wire end and said exterior surface of said insulation material adjacent said anode end of said pellet so that said anode layer of conductive material is in electrical contact with and covers said wire end;

attaching a conductive anode termination cap in covering relation over, and in electrical contact with, said anode layer of conductive material, whereby electrical continuity is achieved from said anode end of said tantalum pellet, through said wire and said anode layer of conductive material to said conductive anode termination cap;

applying a cathode layer of conductive material over at least a portion of said cathode end of said pellet; and attaching a conductive cathode termination cap in covering relation over, and in electrical contact with, said cathode end of said tantalum pellet.

2. A method according to claim 1 wherein said removing step comprises cutting said wire and said steps of applying said anode layer and attaching said anode termination cap are completed without any further operations being performed on said exposed portion of said wire.

3. A method according to claim 1 wherein said removing step comprises grinding said wire to make said wire flush with said exterior surface of said layer of said insulation material.

4. A method according to claim 1 wherein said steps of applying said anode and cathode layers of conductive material are combined to comprise applying said conductive material over the entire surface of said pellet, masking said anode and cathode ends of said pellet with anode and cathode masks, removing said conductive material from the unmasked portions of said pellet, and removing said anode and cathode masks from said pellet.

5. A method according to claim 1 wherein said steps of applying said anode and cathode layers of conductive material are performed by applying silver paint to said anode and cathode ends of said pellet.

6. A method according to claim 1 wherein said steps of applying said anode and cathode layers of conductive material are performed by a method selected from the group consisting essentially of plating, sputtering, and painting.

7. A method according to claim 1 wherein said step of forming said tantalum pellet further comprises embedding a first wire end inside said pellet whereby said wire upon completion of said step of applying said anode layer of conductive material extends from said first wire end within said pellet through said layer of insulation material into contact with said anode layer of conductive material.

* * * * *